United States Patent
Barbera (10) Patent No.: US 7,505,784 B2
(45) Date of Patent: Mar. 17, 2009

(54) SAFETY FEATURES FOR PORTABLE ELECTRONIC DEVICE

(76) Inventor: Melvin A. Barbera, 740 Lindley Way, Hamilton, OH (US) 45011-9166

( * ) Notice: Subject to any disclaimer, the term of this patent is extended or adjusted under 35 U.S.C. 154(b) by 539 days.

(21) Appl. No.: 11/285,556

(22) Filed: Nov. 22, 2005

(65) Prior Publication Data
US 2007/0072553 A1 Mar. 29, 2007

Related U.S. Application Data (60) Provisional application No. 60/720,528, filed on Sep. 26, 2005.

(51) Int. Cl.
*H04M 1/00* (2006.01)
(52) U.S. Cl. .................... 455/557; 455/345; 455/569.2; 455/575.9
(58) Field of Classification Search ................. 455/344, 455/345, 550.1, 556.1, 557, 565, 567, 568.1, 455/569.2, 575.1, 575.9, 569.1; 340/438, 340/441, 525, 575, 576, 901
See application file for complete search history.

(56) References Cited

U.S. PATENT DOCUMENTS

| | | | |
|---|---|---|---|
| 4,989,230 A | | 1/1991 | Gillig et al. |
| 5,301,227 A | * | 4/1994 | Kamei et al. ................. 455/565 |
| 6,188,315 B1 | * | 2/2001 | Herbert et al. ............... 340/438 |
| 6,263,190 B1 | * | 7/2001 | Mamori et al. ........... 455/67.11 |
| 6,353,778 B1 | * | 3/2002 | Brown .......................... 340/441 |
| 6,421,538 B1 | | 7/2002 | Byrne |
| 6,424,888 B1 | * | 7/2002 | Sone et al. ................ 455/550.1 |
| 6,556,185 B2 | | 4/2003 | Rekimoto |
| 6,647,328 B2 | * | 11/2003 | Walker ......................... 701/36 |
| 6,690,292 B1 | | 2/2004 | Meadows et al. |
| 6,845,316 B2 | | 1/2005 | Yates |

(Continued)

FOREIGN PATENT DOCUMENTS

EP 0 660 627 A2 6/1995

(Continued)

OTHER PUBLICATIONS (Author Unknown); "Mitsubishi Launches Compact, Multi-Function Digital Phone"; Dempa Shimbun; Jul. 10, 1997; p. 5; published in Japan [translated excerpt].

(Continued)

*Primary Examiner*—Quochien B Vuong
(74) *Attorney, Agent, or Firm*—Frost Brown Todd LLC (57) ABSTRACT

A portable electronic device includes a safety feature configured to prevent at least some forms of use of the device when the user is traveling beyond a speed threshold. The device may detect its linear speed, compare that speed to a threshold, and provide a response or blocking function upon detecting that the speed has exceeded a threshold. In one embodiment, the device is a cell phone configured to disable the transmission and reception of voice and text, conceal its display screen, and disable incorporated games, cameras, internet access, etc., if the cell phone is moving faster than walking speed. The blocking function in a cell phone may be partially overridden by the introduction of hands-free equipment. The introduction of a hands-free earpiece and microphone may serve to override the blocking of voice transmission and reception, and may also enable a voice activated dialing and/or answering function.

19 Claims, 2 Drawing Sheets

U.S. PATENT DOCUMENTS

| | | | |
|---|---|---|---|
| 6,901,264 | B2 | 5/2005 | Myr |
| 2001/0056544 | A1 | 12/2001 | Walker |
| 2002/0075815 | A1 | 6/2002 | Sharma et al. |
| 2004/0198306 | A1 | 10/2004 | Singh et al. |
| 2005/0195105 | A1 | 9/2005 | McBurney et al. |

FOREIGN PATENT DOCUMENTS

| | | |
|---|---|---|
| EP | 0660627 | 6/1995 |
| GB | 2378878 A | 2/2003 |
| WO | WO 03/028342 | 4/2003 |
| WO | WO 03/028342 A2 | 4/2003 |
| WO | WO 03/028342 A3 | 4/2003 |

OTHER PUBLICATIONS (Author Unknown); "Americans Not Doing Enough to Ensure Safe Driving;" U.S. Newswire; Sep. 30, 2004.

Katsutoshi, Hayashi; "Portable Electronic Device"; Aug. 15, 1997; JPO; published in Japan [translated abstract for Japanese Patent Publication No. 09212462 A].

Hirohide, Miwa; "Mobile Communication System In Common Use for Pager and Terminal Equipment for the System"; Jul. 15, 1997; JPO; published in Japan [translated abstract for Japanese Patent Publication No. 09187078 A].

Schmidt, Charlie; "The Road Ahead"; Technology Review; Jul. 1, 2001; p. 73; vol. 104, Issue 6, MIT.

(Author Unknown); "SiRF Announces a Novel and Cost Effective Vehicle Positioning Approach for Navigation & Telematics Products"; May 16, 2005; Newswire.

(Author Unknown); "Fatal Distraction"; Jun. 27, 2001; St. Louis Dispatch; p. B6; Pulitzer Publishing Company.

(Author Unknown); "CSI Wireless' New Asset-Link™ Products Win Carrier Approvals, Attract $1M+ of Initial Sales"; Aug. 16, 2005; PRNewswire.

Cain, et al.; "Investigation of the Use of Mobile Phones While Driving"; Apr. 1999; Center for Urban Transportation Research, College of Engineering, University of South Florida [available at http://www.cutr.usf.edu/its/mobile_phone.htm].

(Author Unknown); "An Investigation of the Safety Implications of Wireless Communications in Vehicles"; Nov. 1997; Preface, Executive Summary, Report Summary, and Chapter 6; National Highway Traffic Safety Administration [available at http://www.nhtsa.dot.gov/people/injury/research/wireless/].

(Author Unknown); "Collision Risk Is Four Times Greater When Using Cell Phone While Driving"; Aug. 31, 2000; University of Minnesota.

Knowles, Bryan; "Should Using a Cell Phone While Driving Be Illegal?"; Jun. 15, 2000.

Incantalupo, Tom; "Driving Under Influence of a Phone"; Jul. 23, 2003; Newsday.

(Author Unknown); "NJ Wants Tougher Cell Phone Driving Ban"; Sep. 28, 2005; Associated Press.

Warner, Jennifer; "Listening Poses Cell Phone Driving Dangers"; Aug. 26, 2005; WebMD.

(Author Unknown); "Cell Phone Driving Bans Don't Always Work"; Feb. 10, 2004; Health on the Net Foundation.

Roma, Shelly; "Young Cell Phone Drivers' Dial-emma"; 2005; MSNBC.com.

(Author Unknown); "Countries that Ban Cell Phones While Driving"; (Oct. 3, 2005).

International Search Report, dated Nov. 6, 2007 for PCT Application No. PCT/US06/29885.

Written Opinion, dated Nov. 6, 2007 for PCT Appliction No. PCT/US06/29885.

\* cited by examiner

SAFETY FEATURES FOR PORTABLE ELECTRONIC DEVICE

PRIORITY

This application claims priority from the disclosure of U.S. Provisional Patent Application Ser. No. 60/720,528, entitled "Safety Features for Portable Electronic Device," filed Sep. 26, 2005, the disclosure of which is incorporated by reference herein.

BACKGROUND OF THE INVENTION

There are a variety of safety concerns associated with using portable electronic devices (e.g., cellular telephones) while driving a vehicle or during other activities. A variety of measures have been taken to address such concerns, including legal measures, but no one prior to the inventor has created or used the invention described in the appended claims.

BRIEF DESCRIPTION OF THE DRAWINGS

While the specification concludes with claims that particularly point out and distinctly claim the invention, it is believed the expressly disclosed exemplary embodiments of the present invention can be understood from the following description taken in conjunction with the accompanying drawings, in which like reference numerals identify the same elements. The drawings and detailed description which follow are intended to be merely illustrative of the expressly disclosed exemplary embodiments and are not intended to limit the scope of the invention as set forth in the appended claims. In the drawings:

DETAILED DESCRIPTION OF EMBODIMENTS OF THE INVENTION

The following description should not be used to limit the scope of the present invention. Other examples, features, aspects, embodiments, and advantages of the invention will become apparent to those skilled in the art from the following description, which includes by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive. It should therefore be understood that the inventor contemplates a variety of embodiments that are not explicitly disclosed herein.

Figure 1:
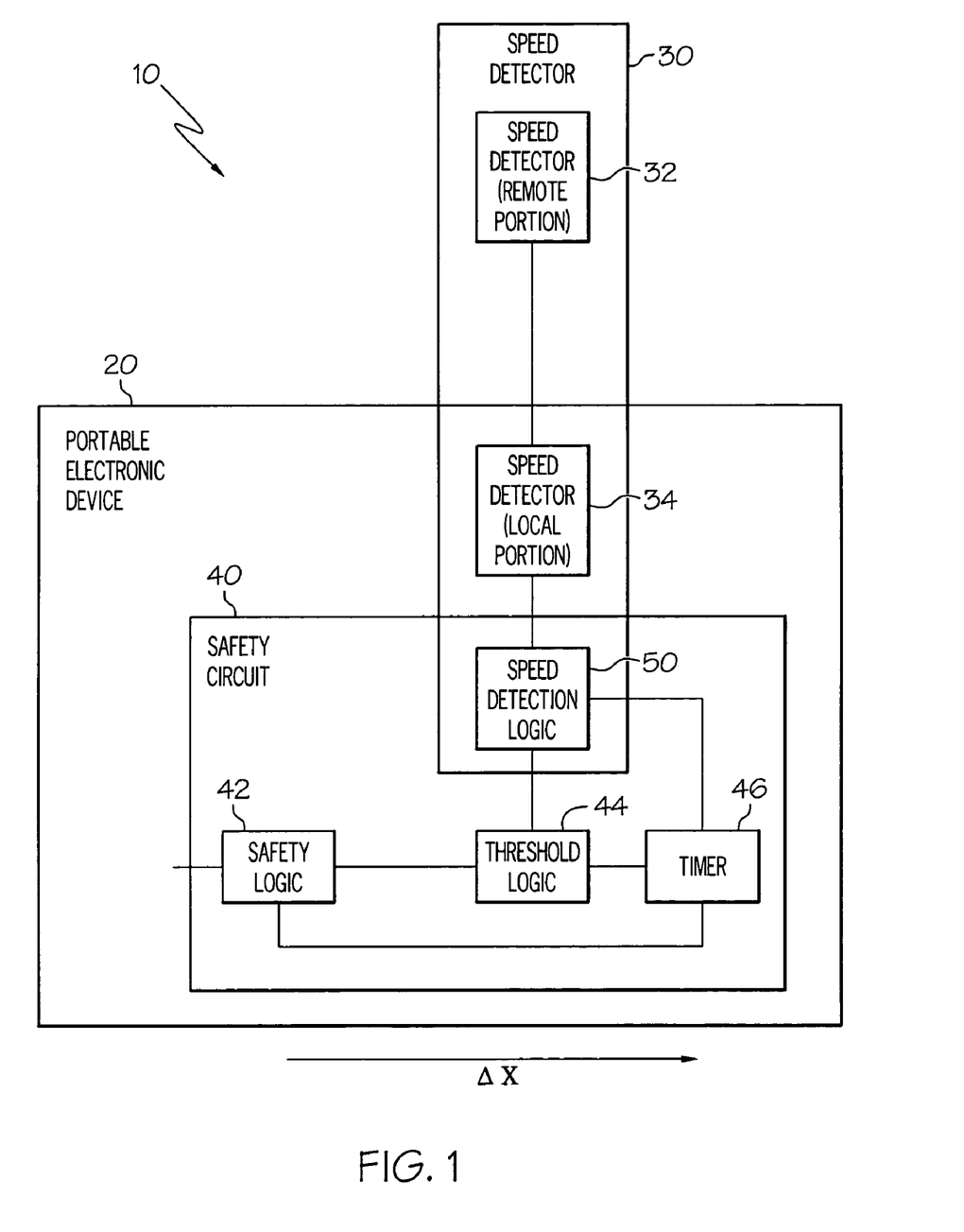
FIG. 1 is a schematic view of an exemplary portable electronic device system.

In FIG. 1, an exemplary portable electronic device system (10) is shown, comprising a portable electronic device (20) and a speed detector (30). In one embodiment, the portable electronic device (20) comprises a cell phone. As used herein, the term "cell phone" shall be read to include devices having walkie-talkie features. It will be appreciated, however, a portable electronic device (20) may comprise a variety of other electronic devices, including but not limited to portable digital assistants (PDA's), laptop computers, MP3 players such as I-PODS and the like, other telecommunications devices, other data processing devices, and the like. Other suitable examples of a portable electronic device (20) will be apparent to those of ordinary skill in the art.

In the present example, a local portion (34) of the speed detector (30) is integral with the portable electronic device (20). However, it will be appreciated that the entirety of speed detector (30) may be integral with or otherwise local to the portable electronic device (20).

Alternatively, the entirety of speed detector (30) may be separate from, outside of, or otherwise remote relative to the portable electronic device (20). Still other suitable relative configurations of portable electronic device (20) and speed detector (30) will be apparent to those of ordinary skill in the art. Exemplary embodiments of the portable electronic device (20) and the speed detector (30) will be discussed in greater detail below, while other embodiments will be apparent to those of ordinary skill in the art in view of the teachings herein.

The speed detector (30) of the present example comprises a remote portion (32) and a local portion (34). In this example, the remote portion (32) is positioned outside of the portable electronic device (20); while the local portion (34) is positioned within the portable electronic device (20). The remote portion (32) is in communication with the local portion (34). The speed detector (30) further comprises a speed detection logic (50) in communication with the local portion (34). Of course, the speed detection logic (50) may be in communication with remote portion (32) in addition to or as an alternative to being in communication with local portion (34).

In the present example, the speed detector (30) is operable to determine the speed at which the portable electronic device is traveling (e.g., linear speed), and is configured to communicate a signal from the speed detection logic (50) that is indicative of that detected speed.

Various methods and devices for accomplishing such speed detection will be described in greater detail below, while others will be apparent to those of ordinary skill in the art in view of the teachings herein.

In one embodiment, the speed detector (30) comprises a Global Positioning System (GPS). In particular, a remote portion (32) of the speed detector (30) comprises one or more GPS satellites; while a local portion (34) of the speed detector comprises a GPS receiver. Various ways in which a GPS system may be used in accordance with several embodiments will be discussed in greater detail herein, while others will be apparent to those of ordinary skill in the art in view of the teachings herein. In addition, components other than GPS systems that are suitable for providing a speed detector (30) will be apparent to those of ordinary skill in the art.

In another embodiment, speed is determined using land-based signal triangulation techniques. In this embodiment, the portable electronic device (20) comprise a transmitter/receiver as a local portion (34) of a speed detector (30); with a remote portion (32) of the speed detector (30) comprising a plurality of fixed base stations. For instance, three fixed base stations may send a signal, with the transmitter/receiver sending a responding signal. The time it takes for these signals to arrive may be used in a mathematical triangulation algorithm to calculate the position of the cell phone, with changes in position leading to speed. Suitable triangulation techniques for obtaining traffic information and providing emergency response are disclosed in U.S. Pat. No. 6,901,264, the disclosure of which is incorporated by reference herein. Of course, any number of base stations may be used, as may any other variation of the triangulation techniques described above. Similarly, any other type of speed detector (30) may be used.

The portable electronic device (20) of the present example comprises a safety circuit (40). In the present example, safety circuit (40) resides within the portable electronic device (20).

However, it will be appreciated that all or part of safety circuit (40) may reside outside of the portable electronic device (20). The safety circuit (40) comprises a safety logic (42), a threshold logic (44), and a timer (46). In the present example, the speed detection logic (50) is also part of the safety circuit (40) (i.e., in addition to being part of the speed detector (30)). The timer (46) is operable to communicate a signal indicative of time, such as a periodic pulse or the like. The timer (46) is in communication with the speed detection logic (50), the threshold logic (44), and the safety logic (42) in this example. Those of ordinary skill in the art will appreciate, however, that timer (46) may be in communication with less than all of these components, or may be otherwise substituted, supplemented, or omitted altogether.

In one embodiment, the remote portion (32) and local portion (34) of speed detector (30) are operable to determine positioning of the portable electronic device (20). The remote portion (32) and local portion (34) of speed detector (30) are further operable to communicate such positioning information to the speed detection logic (50). With at least two sets of positioning information, the speed detection logic (50) is operable to calculate a distance traveled by the portable electronic device (20). Using the timing signal communicated by the timer (46), the speed detection logic (50) is operable to calculate the speed at which the portable electronic device (20) is traveling by dividing the distance traveled by the time taken to travel that distance. The speed detection logic (50) then communicates a signal to the threshold logic (44) indicative of the speed calculated by the speed detection logic (50). Of course, a variety of alternative methods and techniques may be used to determine the speed at which portable electronic device (20) is traveling, all of which are contemplated herein.

In another embodiment, the speed detector (30) is configured to take positioning readings at predetermined time intervals. In this embodiment, the timer (46) is used to communicate the passage of such time intervals to the speed detector (30). Thus, with the time interval between first and second positions being known, the timer (46) need not be in communication with the speed detection logic (50). That is, the value of the predetermined time interval may be already incorporated into the speed detection logic (50). In yet another embodiment, the timer (46) communicates passage of a predetermined time interval to the speed detection logic (50), and the speed detection logic (50) uses such a communication to command the local portion (34) and/or remote portion (32) of the speed detector (30) to take positioning readings at such times. Still other suitable structural and logical configurations will be apparent to those of ordinary skill in the art.

The threshold logic (44) in this example is configured to compare the speed indicated by the signal communicated by the speed detection logic (50) to a threshold value. When the indicated speed exceeds the threshold value, the threshold logic (44) is configured to communicate a signal to the safety logic (42) to indicate that the threshold has been exceeded. In one embodiment, where the threshold logic (44) is further in communication with the timer (46), the threshold logic (44) is configured such that it will communicate the signal to the safety logic (44) only when the speed threshold has been exceeded for a certain amount of time. In other words, in this embodiment, the threshold logic (44) is configured to determine the amount of time during which the portable electronic device (20) is traveling beyond a threshold speed. In another embodiment, the threshold logic (44) simply communicates a signal to the safety logic (42) when the threshold speed has been exceeded, and the safety logic (42), being in communication with the timer (46), determines whether the threshold speed has been exceeded for a certain amount of time. In either case, it will be appreciated that the signal communicated by threshold logic (44) may be substantially instantaneous (e.g., a single pulse) to indicate that the threshold has been exceeded, may be continuous during the time that the threshold is being exceeded, or may have any other duration(s) or properties.

In the present example, the safety logic (42) is operable to communicate one or more signals to another component of the portable electronic device (20). Such a signal may be communicated in response to an indication from the threshold logic (44) that the speed threshold has been exceeded, that the speed threshold has been exceeded for a certain period of time, or in response to any other condition(s). In this example, the signal(s) communicated by the safety logic (42) is configured to disable one or more functions of the portable electronic device (20), as will be described in greater detail below.

It will be appreciated that safety logic (42) may be configured such that different signals may be communicated by safety logic (42) in response to different speed thresholds being exceeded and/or other different conditions, with such different signals being communicated from safety logic (42) effecting the disablement of different functions of the portable electronic device (20). In other words, safety logic (42) may be configured to disable a variety of functions of portable electronic device (20) in response to a variety of conditions, including combinations thereof. By way of example only, the conditions triggering such a response from the safety logic (42) may comprise one or both of speed and time. As another example, where a plurality of functions may be disabled in response to a plurality of conditions, the particular function(s) disabled may be dependent upon a particular condition or particular conditions. Other suitable conditions and responses will be apparent to those of ordinary skill in the art.

Figure 2:
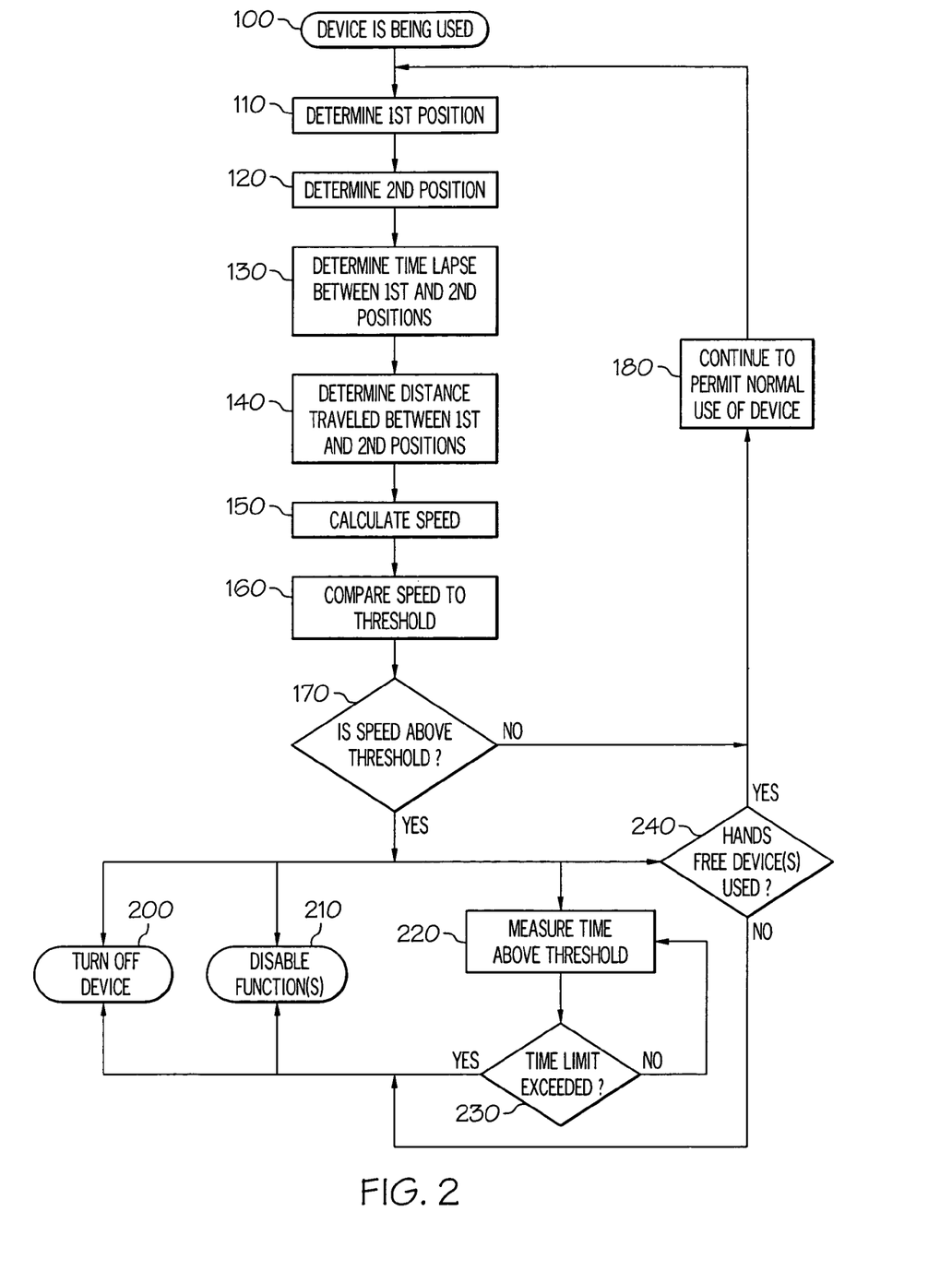
FIG. 2 is a block diagram showing an exemplary set of steps that may be performed by the system shown in FIG. 1.

A flow diagram is provided in FIG. 2 to illustrate several possible steps that may be used in performing exemplary methods in accordance with several embodiments described herein. In block (100), the portable electronic device (20) is being used. In block (110), a first position of the portable electronic device (20) is determined. In block (120), a second position of the portable electronic device (20) is determined. It will be appreciated that such positioning determinations (110, 120) may be performed using one or both of the remote portion (32) and the local portion (34) of the speed detector (30), and/or using any other suitable component(s).

In block (130), the lapse of time between the portable electronic device (20) being in the first and second positions is determined. It will be appreciated that such a lapse of time determination (130) may be performed using the speed detection logic (50) and/or timer (46), and/or using any other suitable component(s). It will also be appreciated that the lapse of time may be a predetermined value as described above. In other words, the positioning determinations (110, 120) may be made at predetermined time intervals, such that the lapse of time between the two positions is predetermined. The timer (46) may be used to provide such a predetermined time interval. Suitable time intervals for making positioning determinations (110, 120) in such an embodiment will be apparent to those of ordinary skill in the art.

In yet another embodiment, predetermined time intervals are used by default, with ad hoc time intervals being determined (130) where the second position cannot be determined (120) for whatever reason at the expiration of the default predetermined time interval. For instance, where a speed detector (30) comprises a GPS system, a predetermined time interval for making positioning determinations (110, 120) may be used by default, with an ad hoc time interval being determined (130) when the second position cannot be determined (120) at the expiration of the predetermined time interval when communication of the GPS system breaks down due to temporary interference with or obstruction of the GPS signal. Still other variations will be apparent to those of ordinary skill in the art.

In block (140), the distance traveled by the portable electronic device (20) between the first and second positions is determined. Such a distance traveled determination (140) may be performed by the speed detection logic (50) and/or any other suitable component(s). This distance traveled determination (140) may be based on the first and second positions determined in blocks (110) and (120), or may be otherwise determined.

Next, in block (150), the speed at which the portable electronic device (20) is traveling is determined. Such a speed determination (150) may be performed by the speed detection logic (50) and/or any other suitable component(s). In one embodiment, the speed is calculated by dividing the distance traveled, as determined in block (140), by the time taken to travel that distance, as determined in block (130). Of course, any other methods and/or components may be used to determine the speed at which the portable electronic device (20) is traveling.

In block (160), the speed calculated in block (150) is compared to a threshold. Such a threshold comparison (160) may be performed by the threshold logic (44) and/or any other suitable component(s). In one embodiment, the speed threshold is approximately equal to average walking speed (e.g., 2-4 mph). In another embodiment, the speed threshold is approximately equal to average running speed (e.g., 4-10 mph). In yet another embodiment, the speed threshold is approximately 25 mph. In addition, it will be appreciated that several thresholds may be used. For instance, the applicable threshold may depend on a variety of conditions (e.g., location, the type of device, etc.). In another embodiment, a speed threshold is set by a consumer as described in greater detail below. Still other suitable speed threshold values, as well as ways in which the use of speed thresholds may be varied, will be apparent to those of ordinary skill in the art.

In block (170), it is determined whether the speed calculated in block (150) is in excess of the threshold. This determination (170) may be performed by the threshold logic (44) and/or any other suitable component(s). If the determination of block (170) is that the speed of the portable electronic device (20) is not above the threshold, the method may proceed to block (180), which comprises continuing to permit normal use of the portable electronic device (20). In such a situation, the method may proceed back to block (110), to determine positioning, time lapse, distance traveled, speed, etc. again.

It will be appreciated that some level of data processing may be required in order to determine speed (150) and/or to compare the determined speed to a threshold (160). In one embodiment, the processing is performed locally (e.g., within the portable electronic device (20)). In another embodiment, the processing is performed remotely (i.e., remote from the portable electronic device (20)). Of course, the processing may also comprise a combination of local and remote processing.

As shown in FIG. 2, a variety of responses may be provided upon a determination (170) that the speed is in excess of the threshold. One exemplary response is to simply turn off the portable electronic device (20), as shown in block (200). For instance, all further use of the portable electronic device (20) may be prevented until the speed falls back below the threshold when the portable electronic device (20) is turned back on.

Another exemplary response is to disable one or more functions of the portable electronic device (20), as shown in block (210), and as will be described in greater detail below. It will be appreciated that the above responses (200, 210) may be provided via a signal from the safety logic (42) and/or any other suitable component(s). In one embodiment, the portable electronic device (20) is a telecommunications device that provides voice communication and text messaging. In this embodiment, transmission of such voice and text is blocked as part of a function disabling response (210). In another version of this embodiment, text messaging capabilities are disabled while voice communication is permitted. Other variations will be apparent to those of ordinary skill in the art. The disablement of a function (210) of a portable electronic device (20) may be referred to herein as a "blocking function." Thus, as used herein, it will be appreciated that a "blocking function" is operable to block, disable, or otherwise affect another function of a portable electronic device (20).

In another embodiment, the portable electronic device (20) is a telecommunications device that provides walkie-talkie communication.

For instance, an example of such a portable electronic device (20) in this embodiment may be a cell phone that has a walkie-talkie feature.

In this embodiment, the walkie-talkie functioning of the portable electronic device (20) is disabled as part of a function disabling (210) response. Of course, other variations with such a device may be used.

In another embodiment, the portable electronic device (20) has a display screen. An example of such a portable electronic device (20) in this embodiment may be an I-POD, cell phone, PDA, etc. In this embodiment, the display screen is disabled as part of a function disabling response (210).

While several examples of complete or partial disablement of one or more functions have been described above, it will be appreciated that any other functions may be disabled as part of a function disabling response (210), including but not limited to disablement of incorporated games, cameras, internet access, etc., including combinations thereof. In addition, where more than one speed threshold is used, certain responses may be associated with a particular threshold. Similarly, as will be described in greater detail below, certain responses may be provided at different time intervals during a period at which the speed is above a threshold.

Yet another exemplary response is to measure the time during which the speed is above the threshold, as shown in block (220). By comparing such time during which the speed is above the threshold against a time limit, a determination may be made as to whether the time limit has been exceeded, as shown in block (230). If the time limit has not yet been exceeded, the time during which the speed is above the threshold may continue to be measured (220) and compared against a time limit to determine (230) whether the time limit has been exceeded. Upon determining (230) that the time limit has been exceeded, a response; such as turning off the device (200) or disabling one or more functions of the device (210), may be provided. It will also be appreciated that more than one time limit may be used. For instance, a variety of time limits may be used, with one of the time limits being selected based on the speed calculated in block (150) or based on any other condition(s). Still other ways in which one or more time limits may be used will be apparent to those of ordinary skill in the art. It will also be appreciated that the timer (46) and/or any other suitable device may be used to measure (220) the time during which the speed is above the threshold and/or determine (230) whether a time limit has been exceeded.

In yet another embodiment, the portable electronic device (20) is configured to be selectively coupled with one or more hands-free devices, as will be described in greater detail below. In such an embodiment, as shown in block (240), a determination is made as to whether the hands-free device is being used. If it is determined (240) that a hands-free device is being used, the method may include continuing to permit normal use of the portable electronic device (20) as shown in block (180). In another embodiment, partial use of the portable electronic device (20) is permitted in response to determining (240) that a hands-free device is being used. In the present example, if it is determined (240) that a hands-free device is not being used, a response, such as turning off the device (200) or disabling one or more functions of the device (210), is provided. In yet another embodiment, the type of response provided upon a determination (240) that a hands-free device is or is not being used is dependent upon the type of hands-free device being used. Still other ways in which a response may be provided upon a determination (240) that a hands-free device is or is not being used will be apparent to those of ordinary skill in the art.

For instance, in one embodiment of the cell phone example, transmission and reception of voice-only communications is permitted when a hands-free earpiece and microphone attachment is used. In this example, the cell phone may further permit voice activated dialing and/or voice activated answering.

While several exemplary steps have been described above with reference to FIG. 2, it will be appreciated that any of those steps may be varied, substituted, omitted, or supplemented in any suitable way. It will also be appreciated that the steps need not be performed in the order shown. By way of example only, the time lapse determination (130) may be performed after the distance traveled determination (140). Alternatively (e.g., where the time lapse is predetermined), the time lapse determination (130) may be omitted. As another example, the determination (240) of whether a hands free device is being used may be performed before the first position determination (110), such that the first position determination (110) and the steps thereafter are simply not performed when it has been a determined that a hands free device is being used (240). Still other ways in which the methods shown in FIG. 2 may be varied will be apparent to those of ordinary skill in the art.

While several embodiments have been described in general terms above, further embodiments will be described below in more specific terms in the context of a cell phone as a portable electronic device (20).

It will be appreciated, however, that all of the embodiments described herein, regardless of the specificity of such descriptions, are merely exemplary.

In one embodiment, a cell phone is provided with a safety feature that is configured to prevent use of the cell phone when the user and cell phone are traveling beyond a certain speed. It will be appreciated that a variety of techniques for detecting speed may be used, and that a variety of responses may be employed upon the detection of a certain speed. Several of such techniques and responses are described herein, while others will be apparent to those of ordinary skill in the art.

In the present example, a cell phone includes a GPS receiver. It will be appreciated that, by being able to determine the approximate positioning of an object, such GPS systems may also be used to determine the speed of an object.

For instance, and as described above, the speed of an object may be determined by dividing the distance traveled by the object (e.g., calculated by taking two positioning readings) by time taken by the object to travel that distance (e.g., the time between the two positioning readings). A GPS system may thus be used to determine the linear traveling speed of a cell phone, and hence, the speed of a user of the cell phone. It will be appreciated that the accuracy or precision of positioning readings that are used to determine speed need not be great per se. In other words, in one embodiment, the actual location of the device is relatively unimportant, while the change in location of the device is more important. Alternatively, a device may be used where the actual location of the device is more important. In another embodiment, the actual location of the device and the change in location of the device are simply irrelevant (e.g., the speed is determined using an alternative technique). Thus, while several devices and techniques for determining speed (150) have been described above, it will be appreciated that a variety of alternative devices and techniques may be used to determine speed (150). Such alternatives will be apparent to those of ordinary skill in the art.

In the present example, a cell phone is configured to detect its speed when it is turned on, before permitting use. Subject to some conditions, the cell phone will permit use upon being turned on only if the speed is below a certain threshold. If the speed is below the threshold, the cell phone will permit use until that threshold is exceeded. Thus, it will be appreciated that the cell phone may continue to monitor speed during use of the cell phone. Such monitoring may be substantially continuous, periodic, or be triggered by any suitable event(s) or condition(s).

Upon detecting that the speed has exceeded a speed threshold, the cell phone of the present example is configured to provide one or more responses. For instance, such responses may be provided in the form of response functions or blocking functions. In one embodiment, a cell phone is simply turned off when the speed is above a threshold, and all further use of the cell phone is prevented until the speed falls back below the threshold when the cell phone is turned back on. In another embodiment, the cell phone remains on during the response, but the cell phone is configured to block transmission and reception of voice and text messaging (e.g., through standard telephony protocol, via a walkie-talkie feature, or otherwise, including combinations thereof), to conceal the display screen, and to disable incorporated games, cameras, internet access, etc. Of course, a variety of alternative responses may be employed upon the detection that the speed has exceeded a threshold. When one or more response functions have been effected, the cell phone or other portable electronic device (20) may be considered to be in a "safe mode."

It will be appreciated that a portable electronic device (20) may optionally further comprise a feature configured to at least partially override the response/blocking function(s) under certain conditions.

For instance, in one embodiment of the cell phone example, a feature is configured to override the blocking of transmission and reception of voice-only communications when a hands-free earpiece and microphone attachment is used. Such overriding may occur regardless of whether the earpiece and/or microphone is hard-wired or wireless.

In this example, the cell phone may further permit voice activated dialing and/or voice activated answering. Of course, a variety of other conditions may trigger the overriding of one or more blocking functions. Other conditions, as well as other blocking functions that may be at least partially overridden, will be apparent to those of ordinary skill in the art.

As used herein, terms such as "override," "overridden," etc. shall be understood to refer to instances where one or more signals to effect a response/blocking function are present, but at least one of those one or more signals are nullified by one or more separate override signals.

Such terms shall also be understood to refer to an instance where at least one signal to effect a blocking function is simply removed. In addition, such terms shall be understood to include an instance where speed detection, threshold comparison, and/or some other portion of the methods described herein is not performed in response to the presence of a condition such as use of a hands-free device. In addition, the terms shall include all functional equivalents of these instances.

In yet another embodiment, at least a portion of the blocking function(s) is/are overridden when the user is a passenger in a car, train, airplane, etc. Alternatively, a portable electronic device (20) may be configured such that the speed detecting and/or blocking functions may be enabled only when the user is in a car or is driving a car.

In one example of this embodiment, such positioning of the user is determined by comparing GPS positioning data to a map, two-dimensional model of an environment, three-dimensional model of an environment, or the like. For instance, where a map or model includes streets, and the resolution of the GPS technology permits the determination of whether a user is closer to the middle of the street or the edge of the street, the position of the user in a car (e.g., driver side or passenger side) may be inferred. Such intra-vehicle positioning may be used to prevent the disablement of cell phone features despite a non-driving user's traveling speed being beyond the threshold. In other words, where the user of a portable electronic device (20) is a passenger in a car traveling at a speed above the threshold, and it is determined that the user is a passenger and not the driver of the car, one or more blocking functions may be prevented based on the determination that the user is a passenger and not the driver. Still other ways in which the status of a user of a portable electronic device (20) may be determined (e.g., whether the user is a driver or a passenger in a car), and ways in which such a determination may be used to influence the functioning of one or more components of a portable electronic device system (10) (e.g., a safety circuit (40)), will be apparent to those of ordinary skill in the art.

With respect to trains, a map or model may include data representing train tracks, such that it may be determined with the GPS that the user is traveling beyond the threshold speed over the train tracks (versus on a road). In this example, the portable electronic device (20) may continue to function as if the user were not moving at all, in spite of the fact that the user is traveling beyond the threshold speed. With respect to airplanes and the like, the speed detector (30) or other technology may provide altitude data sufficient to infer that the user is not driving a car. In another embodiment, an additional speed threshold is provided, whereby the cell phone will not switch to a safe mode when the speed exceeds this additional threshold. For instance, this additional threshold may be a speed at which airplanes typically travel, beyond a speed at which automobiles typically travel. In this example, a safe mode may be activated when the detected speed is between two thresholds, and not activated when the speed is below the first threshold or above the second threshold. Other ways for determining the position of a user within a vehicle, whether the user is driving a vehicle, and/or what type of vehicle a user is in, and ways in which such a determination may be used to influence the functioning of one or more components of a portable electronic device system (10) (e.g., a safety circuit (40)), will be apparent to those of ordinary skill in the art.

Notwithstanding the various potential overrides, such as those described above, the one or more responses to the detection of the speed exceeding the threshold may cease or otherwise be removed when the speed falls below the threshold. For instance, after detecting that the speed has exceeded the threshold, and implementing the response(s), the cell phone of the present example may continue to perform speed detecting functions on a periodic or other basis to determine whether the speed has fallen below the threshold. Upon detecting that the speed has fallen below the threshold, the cell phone of the present example may remove the blocking function(s) and permit unrestrained use until the speed again exceeds the threshold.

Alternatively, a timer, such as the timer (46) shown in FIG. 1, may be used such that blocking functions are removed only when the speed remains below the threshold for a certain period of time. For instance, in one embodiment, normal use of a portable electronic device (20) is permitted immediately upon a determination that the speed fallen blow the threshold. In another embodiment, normal use of a portable electronic device (20) is permitted only upon a determination that the speed has fallen below the threshold for a certain period of time. In yet another embodiment, using a tiered approach, a plurality of time periods are used as milestones, such that one or more functions are re-enabled at certain times after the speed has fallen below the threshold. Still other ways in which a timer (46), counter, or similar device may be used after the speed has fallen back below the threshold, including but not limited to the use of such a device to influence the re-enablement of one or more functions of a portable electronic device (20), will be apparent to those of ordinary skill in the art.

Similarly, as discussed above, a timer (46) or other device may be used such that the blocking functions are applied only when the speed exceeds the threshold for a certain period of time. In another embodiment, where the portable electronic device (20) is a cell phone, normal use of the cell phone is at least partially permitted after the speed has exceeded a threshold, but a timer (46) or other device is used to place time limits on individual telephone communications made during the period that the speed is above the threshold. For instance, a cell phone may be configured such that telephone calls are only permitted to last 1 minute if the calls are made, received, or otherwise in progress during the time that the speed is above the threshold. Of course, any other duration limit may be used. In yet another embodiment of the cell phone example, a timer (46) is used to govern the frequency of telephone calls during the period that the speed is above the threshold. For instance, if a call ends during the period that the speed is above the threshold, a timer (46) may be used to prevent another call from being made and/or received until a certain amount of time has passed. Other ways in which a timer (46) or similar device may be used will be apparent to those of ordinary skill in the art. It will also be appreciated that a timer (46) may be substituted or supplemented in any suitable way. For instance, and without limitation, a counter or other device may be used to limit the number and/or frequency of calls made on a cell phone when the speed is above the threshold and/or within a certain period of time.

In yet another variation, the cell phone of the present example may be configured to determine whether its speed has fallen below the threshold only when the user attempts to turn the cell phone on. For instance, in the embodiment where the cell phone is turned off when the speed exceeds the threshold, such as in the step indicated by block (200) in FIG. 2, the speed detection will cease until the cell phone is turned back on.

In embodiments where GPS or similar technologies are used to detect speed, it will be appreciated that occasions may arise where environmental factors or other factors may adversely affect the functioning of the GPS or other device. For instance, a GPS signal may be blocked while a user is traveling in a tunnel, between skyscrapers, etc., such that the speed of the portable electronic device (20) cannot be determined. In such situations, the portable electronic device (20) may be configured to default to a particular mode. In one embodiment, a portable electronic device (20) defaults to a safe mode when the speed cannot be detected due to GPS signal blockage or other reasons. In another embodiment, a portable electronic device (20) defaults to a fully operational mode when the speed cannot be detected due to GPS signal blockage or other reasons. In yet another embodiment, alternative speed detecting devices/techniques are used when a default speed detecting device/technique ceases to yield satisfactory results. Other ways in which the inability to detect speed may be addressed will be apparent to those of ordinary skill in the art.

It will also be appreciated that features described herein may be subject to consumer activation. In other words, a consumer may be given the choice of having the speed detection and/or response functions activated or otherwise enabled. For instance, a parent may purchase a pair of cell phones—one for himself/herself and one for his/her child. The parent may activate the speed detection and response functions with respect to his/her child's cell phone, but refrain from activating the functions with respect to his/her own cell phone. The cell phone manufacturer, service provider, parent, or other entity, may activate or otherwise enable the speed detection and response functions in the cell phone(s) accordingly. Accordingly, as used herein, the term "consumer" shall be read to include, but not necessarily be limited to, a retail seller of a portable electronic device (20), a provider of services associated with a portable electronic device (20), a purchaser of a portable electronic device (20), a user of a portable electronic device (20), the parent or another person associated with a user of a portable electronic device (20), a manufacturer of a portable electronic device (20), etc.

In one embodiment, at least a portion of a safety circuit (40) of a portable electronic device (20) is subject to selective consumer activation. In such embodiments, the selective activation of at least a portion of the safety circuit (40) may provide selective activation of one or more of the safety logic (42), the threshold logic (44), the speed detection logic (50), and/or any other component. In another embodiment, a consumer preference logic is present, and is configured to selectively override a signal communicated from and/or within the safety circuit (40). Still other logical and structural configurations for providing selective activation of features described herein will be apparent to those of ordinary skill in the art.

The selective activation of features described herein may further comprise the use of a code. For instance, a parent may use a code to activate the features on a child's cell phone. Such a code may be used locally (e.g., input into the cell phone itself), remotely (e.g., submitted via a telephone to a service provider or via the Internet, etc.), or combinations thereof. It will also be appreciated that, regardless of whether a code is used to activate the features, a code may additionally or alternatively be required to de-activate the features described herein.

In one embodiment, the speed detection and/or response features described herein may be provided by default with a portable electronic device (20), such that de-activation of those features is required in order to disable such features. In another embodiment, the features described herein may be de-activated by default, such that activation of those features is required in order to initially enable such features. In yet another embodiment, a consumer may be provided the option of selecting from among a plurality of available features for activation and/or the option of otherwise configuring the provision of such features. For instance, a consumer may be given the option of selecting the type of response provided through the portable electronic device (20) when the speed has exceeded the threshold, a time period that must lapse with the speed above the threshold before a response is provided, the speed threshold itself, or any other configuration selection. Still other ways in which features may be selectively configured, activated, and/or de-activated, including but not limited to code alternatives and methods of using the same, will be apparent to those of ordinary skill in the art.

Alternatively, portable electronic devices described herein may be provided with the speed detection and response functions enabled regardless of consumer preference for those functions. Accordingly, it will be appreciated that input indicating a consumer preference need not be permitted.

In another embodiment, an alert system is provided. For instance, referring back to the parent-child example above, a system may be configured to provide an alert (e.g., e-mail, voice mail, text message, etc.) to the parent when it is detected that the child has attempted to use the cell phone while traveling beyond the speed threshold. As another example, an alert or other indication that use of the portable electronic device (20) has been attempted while the speed is above the threshold may be recorded in a storage medium within the portable electronic device (20), in a storage medium remote from the portable electronic device (20) (e.g., a storage medium associated with a consumer), or elsewhere. In yet another embodiment, the user of the portable electronic device (20) is provided with an alert. For instance, where the portable electronic device (20) has a speaker or display screen, an alert may be provided through such an interface to inform the user that the portable electronic device (20) is not functioning normally due to the speed being above the threshold, etc. Other forms of alerts, recipients of alerts, and conditions for sending alerts, will be apparent to those of ordinary skill in the art.

Having shown and described various embodiments and concepts of the invention, further adaptations of the methods and systems described herein can be accomplished by appropriate modifications by one of ordinary skill in the art without departing from the scope of the invention. Several of such potential alternatives, modifications, and variations have been mentioned, and others will be apparent to those skilled in the art in light of the foregoing teachings. Accordingly, the invention is intended to embrace all such alternatives, modifications and variations as may fall within the spirit and scope of the appended claims and is understood not to be limited to the details of structure and operation shown and described in the specification and drawings.

What is claimed is:

1. A portable electronic device system, comprising:
   (a) a portable electronic device having a user interface, wherein the portable electronic device is operable to provide a plurality of functions in response to user input received through the user interface, wherein the portable electronic device is configured to be used independently of a vehicle;
   (b) a speed detector in communication with the portable electronic device, wherein the speed detector is configured to detect a linear traveling speed of the portable electronic device, wherein the speed detector is configured to generate and communicate a speed signal indicative of the detected linear traveling speed, wherein at least a portion of the speed detector is located within the portable electronic device;

(c) a safety circuit in communication with the speed detector and the portable electronic device, wherein the safety circuit is configured to receive the speed signal communicated from the speed detector, wherein the safety circuit includes a threshold logic, wherein the threshold logic is configured to compare the speed indicated by the speed signal to a threshold, wherein the safety circuit is further configured to disable at least one of the functions of the portable electronic device in response to detecting that the speed indicated by the speed signal is in excess of the threshold in accordance with the threshold logic; and (d) a consumer input logic in communication with the safety circuit, wherein the consumer input logic is configured to receive input from a consumer of the portable electronic device indicating a consumer preference relating to activation of the safety circuit, wherein the safety circuit is subject to selective activation in accordance with a consumer preference indicated through the consumer input logic, wherein the consumer input logic is configured to selectively override at least a portion of the disablement provided by the safety circuit in accordance with the consumer preference indicated through the consumer input logic.

2. The system of claim 1, wherein the portable electronic device is selected from the group consisting of a cellular phone, a portable digital assistant (PDA), and a laptop computer.

3. The system of claim 1, wherein the user interface comprises at least one hands-free input or output configured to communicate with one or more hands-free user input or output devices.

4. The system of claim 3, wherein the safety circuit further comprises an override logic in communication with the hands-free input or output, wherein the override logic is configured to detect a coupling of one or more hands-free user input or output devices with the at least one hands-free input or output, wherein the override logic is further configured to, in response to detecting the coupling of one or more hands-free user input or output devices with the at least one hands-free input or output, prevent or remove at least a portion of disablement provided by the threshold logic.

5. The system of claim 3, wherein the one or more hands-free user input or output devices comprise one or both of a hands-free earpiece or a hands-free microphone.

6. The system of claim 1, wherein the speed detector comprises a Global Positioning System (GPS).

7. The system of claim 1, wherein a remote portion of the speed detector is located remote from the portable electronic device.

8. The system of claim 7, wherein the remote portion comprises one or more satellites.

9. The system of claim 1, wherein the functions of the portable electronic device comprise transmission and reception of voice to and from the portable electronic device, wherein the safety circuit is configured to disable the transmission and reception of voice to and from the portable electronic device in response to detecting that the speed indicated by the speed signal is in excess of the threshold.

10. The system of claim 1, wherein the safety circuit is located within the portable electronic device.

11. The system of claim 1, further comprising a timer in communication with the safety circuit, wherein the timer is configured to measure an amount of time during which the speed indicated by the speed signal is in excess of the threshold, wherein the safety circuit is configured to disable at least one of the functions of the portable electronic device in response to detecting that the speed indicated by the speed signal is in excess of the threshold for a certain amount of time indicated by the timer.

12. The system of claim 1, wherein the input from the consumer comprises a code.

13. The system of claim 1, further comprising an alert logic in communication with the safety circuit, wherein the alert logic is configured to communicate a notification to a consumer of the portable electronic device in response to at least one of the functions of the portable electronic device being disabled by the safety circuit, wherein the notification is received by the consumer of the portable electronic device at a second device remote from the portable electronic device.

14. A method for providing a safety feature in a portable electronic device, the method comprising:
   (a) providing a portable electronic device, wherein the portable electronic device is operable to provide a plurality of functions in response to user input;
   (b) detecting a linear speed at which the portable electronic device is traveling, wherein the act of detecting a linear speed at which the portable electronic device is traveling comprises receiving input from a speed detector, wherein at least a portion of the speed detector is located within the portable electronic device, wherein the speed detector is configured to determine a geographical location of the portable electronic device;
   (c) comparing the detected linear speed to a threshold;
   (d) determining whether the detected linear speed is in excess of the threshold;
   (e) disabling one or more functions of the plurality of functions in response to a determination that the detected linear speed is in excess of the threshold, wherein the act of disabling is performed by a safety circuit in communication with the speed detector; and
   (f) sending a notification to a consumer in response to an attempt to utilize at least one of the functions of the plurality of functions while the detected linear speed is in excess of the threshold, wherein the notification is sent to a second device remote from the portable electronic device, wherein the second device was not actively communicating with the portable electronic device at the time of the disablement.

15. The method of claim 14, further comprising:
   (a) determining whether one or more hands-free input or output devices are being used to provide user input into the portable electronic device or output from the portable electronic device; and
   (b) preventing or refraining from future performance of the act of disabling in response to a determination that one or more hands-free input or output devices are being used to provide user input into the portable electronic device or output from the portable electronic device.

16. The method of claim 14, further comprising determining an amount of time during which the detected linear speed is in excess of the threshold, wherein the act of disabling is performed in response to the detected linear speed being in excess of the threshold for a certain amount of time.

17. The method of claim 14, wherein at least a portion of the safety circuit is subject to selective activation, the method further comprising:

(a) receiving input from a consumer of the portable electronic device indicating a consumer preference relating to activation of the safety circuit; and
(b) one of:
  (i) activating the safety circuit in response to receiving input from the consumer of the portable electronic device indicating a preference that the safety circuit be activated, wherein the act of activating permits the act of disabling to be performed after the act of activating, or
  (ii) de-activating the safety circuit in response to receiving input from the consumer of the portable electronic device indicating a preference that the safety circuit be de-activated, wherein the act of de-activating prevents the act of disabling from being performed after the act of de-activating.

18. A cellular phone system, comprising:
(a) a cellular phone, wherein the cellular phone is operable to provide a plurality of telecommunications functions, wherein the cellular phone comprises at least one hands-free input or output configured to communicate with one or more hands-free user input or output devices, wherein one of the plurality of telecommunications functions comprises a voice communication function;
(b) a Global Positioning System (GPS), wherein a portion of the GPS is located within the cellular phone, wherein the GPS is configured to communicate positioning data indicating a position of the cellular phone; and
(c) a safety circuit, wherein the safety circuit comprises:
  (i) a speed detecting logic in communication with the GPS, wherein the speed detecting logic is configured to determine a linear speed of the cellular phone based in part on the positioning data communicated by the GPS, wherein the speed detecting logic is further configured to communicate speed data indicating the determined linear speed of the cellular phone,
  (ii) a threshold logic in communication with the speed detecting logic, wherein the threshold logic is configured to determine whether the linear speed of the cellular phone indicated by the speed data exceeds a speed threshold, wherein the threshold logic is further configured to communicate a speed safety signal in response to determining that the linear speed of the cellular phone has exceeded the speed threshold,
  (iii) a safety logic in communication with the threshold logic, wherein the safety logic is configured to disable one or more of the plurality of telecommunications functions of the cellular phone in response to receiving the speed safety signal communicated by the threshold logic,
  (iv) a timer in communication with the cellular phone, the threshold logic and the safety logic, wherein the timer is configured to begin measuring a voice communication duration time upon receipt of the speed safety signal by the safety logic, wherein the voice communication duration time comprises an amount of time the cellular phone is engaged in a single voice communication function, wherein the timer is configured to communicate duration data indicating the voice communication duration time, wherein the threshold logic is further configured to determine whether the voice communication duration time exceeds a duration threshold, wherein the threshold logic is further configured to communicate a duration safety signal in response to determining that the voice communication duration time has exceeded the duration threshold, wherein the safety logic is further configured to disable the voice communication function of the cellular phone in response to receiving the duration safety signal communicated by the threshold logic, and
  (v) an override logic in communication with the hands-free input or output, wherein the override logic is configured to detect a coupling of one or more hands-free user input or output devices with the at least one hands-free input or output, wherein the override logic is further configured to, in response to detecting the coupling of one or more hands-free user input or output devices with the at least one hands-free input or output, prevent or remove at least a portion of disablement provided by the safety logic.

19. The cellular phone system of claim 18, wherein at least a portion of the safety circuit is subject to selective activation or de-activation, the system further comprising:
(a) a consumer input module configured to receive user input indicative of a consumer preference relating to activation or de-activation of the safety circuit; and
(b) an activation logic in communication with both the consumer input module and the safety circuit, wherein the activation logic is configured to activate or de-activate at least a portion of the safety circuit in accordance with the consumer preference indicated by the user input received through the consumer input module.

* * * * *